US012328711B2

(12) United States Patent
Aksu et al.

(10) Patent No.: US 12,328,711 B2
(45) Date of Patent: Jun. 10, 2025

(54) SYSTEMS AND METHODS FOR ENABLING AND UTILIZING RADAR CAPABILITY ON A WIRELESS COMMUNICATION (71) Applicant: Verizon Patent and Licensing Inc., Basking Ridge, NJ (US)

(72) Inventors: Arda Aksu, Lafayette, CA (US); Jin Yang, Orinda, CA (US); Vishwanath Ramamurthi, San Ramon, CA (US); Donna L. Polehn, Mercer Island, WA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/625,677

(22) Filed: Apr. 3, 2024

(65) Prior Publication Data
US 2024/0251390 A1    Jul. 25, 2024

Related U.S. Application Data (63) Continuation of application No. 16/947,746, filed on Aug. 14, 2020, now Pat. No. 11,968,651.

(51) Int. Cl.
| H04W 72/04 | (2023.01) |
| G01S 7/00 | (2006.01) |
| G01S 13/86 | (2006.01) |
| G01S 13/89 | (2006.01) |
| H04W 72/1268 | (2023.01) |
| H04W 72/1273 | (2023.01) |

(52) U.S. Cl.
CPC .............. *H04W 72/04* (2013.01); *G01S 7/006* (2013.01); *G01S 13/86* (2013.01); *G01S 13/89* (2013.01); *H04W 72/1268* (2013.01); *H04W 72/1273* (2013.01)

(58) Field of Classification Search
CPC ........ G01S 19/29; G01S 7/4004; G01S 7/006; G01S 13/89; H04W 72/1268–1273; H04W 72/04
USPC ...................... 342/57, 458; 375/147; 370/347
See application file for complete search history.

(56) References Cited

U.S. PATENT DOCUMENTS

| 10,306,405 | B2 | 5/2019 | Persson et al. |
| 2008/0201468 | A1 | 8/2008 | Titus |
| 2017/0097413 | A1* | 4/2017 | Gillian .................. G01S 7/4004 |
| 2018/0172838 | A1* | 6/2018 | Junker .................... G01S 19/29 |
| 2020/0191913 | A1 | 6/2020 | Zhang et al. |

* cited by examiner

*Primary Examiner* — Bo Fan (57) ABSTRACT

A base station may allocate wireless communication resources to configure a synthetic wireless communication signal for use as a radar signal. The synthetic wireless communication signal may be configured according to a wireless communication protocol of a wireless communication network that is associated with the base station. The base station may transmit, from an antenna and toward an area associated with the base station, the synthetic wireless communication signal. The base station may detect a reflected signal that is associated with the synthetic wireless communication signal. The base station may process the reflected signal to generate radar data; and perform an action associated with the radar data and the area.

20 Claims, 5 Drawing Sheets

SYSTEMS AND METHODS FOR ENABLING AND UTILIZING RADAR CAPABILITY ON A WIRELESS COMMUNICATION

RELATED APPLICATION

This application is a continuation of U.S. patent application Ser. No. 16/947,746, entitled "SYSTEMS AND METHODS FOR ENABLING AND UTILIZING RADAR CAPABILITY ON A WIRELESS COMMUNICATION," filed Aug. 14, 2020, which is incorporated herein by reference in its entirety.

BACKGROUND

Fifth generation New Radio (5G/New Radio or 5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave), and/or the like.

DETAILED DESCRIPTION OF PREFERRED EMBODIMENTS

The following detailed description of example implementations refers to the accompanying drawings. The same reference numbers in different drawings may identify the same or similar elements.

In a fifth generation (5G) network, a base station may enable enhanced connectivity capabilities for users due to availability of a greater amount of bandwidth in a frequency range, such as a millimeter wave (mmWave) frequency range. An operator of the base station may desire to obtain information regarding a topology of an area associated with the base station (e.g., for network planning in the area). For example, the operator may desire to obtain radar data that provides information regarding the topology of the area (e.g., because of a measure of reliability and/or accuracy of radar data). In this regard, the operator may desire radar capability at a location of the base station (e.g., in addition to existing 5G capability of the base station).

The operator may obtain additional hardware (e.g., devices, antennas, and/or the like that transmit radar signals and receive response signals (responsive to the radar signals)) and software (e.g., software applications that process the response signals) to provide the radar capability in the area. After such acquisition, the additional hardware and software may need to be installed at the location and configured prior to using such additional hardware and software to obtain the radar data. Additionally, the additional hardware and software may need to be configured for use in conjunction with the base station. Accordingly, using the additional hardware and software to obtain the radar data may waste computing resources, network resources, and/or the like associated with installing and configuring the additional hardware and software.

Some implementations described herein may configure a base station to transmit a wireless communication signal and process a reflected signal (a signal that is a reflection of the wireless communication signal) to generate radar data. For example, the base station may allocate wireless communication resources to configure a synthetic wireless communication signal for use as a radar signal. The synthetic wireless communication signal may be configured according to a wireless communication protocol of a wireless communication network that is associated with the base station.

The base station may transmit, toward an area associated with the base station, the synthetic wireless communication signal. The base station may detect a reflected signal that is associated with the synthetic wireless communication signal. The base station may process the reflected signal to generate radar data and perform an action associated with the radar data and the area.

Figure 1A:
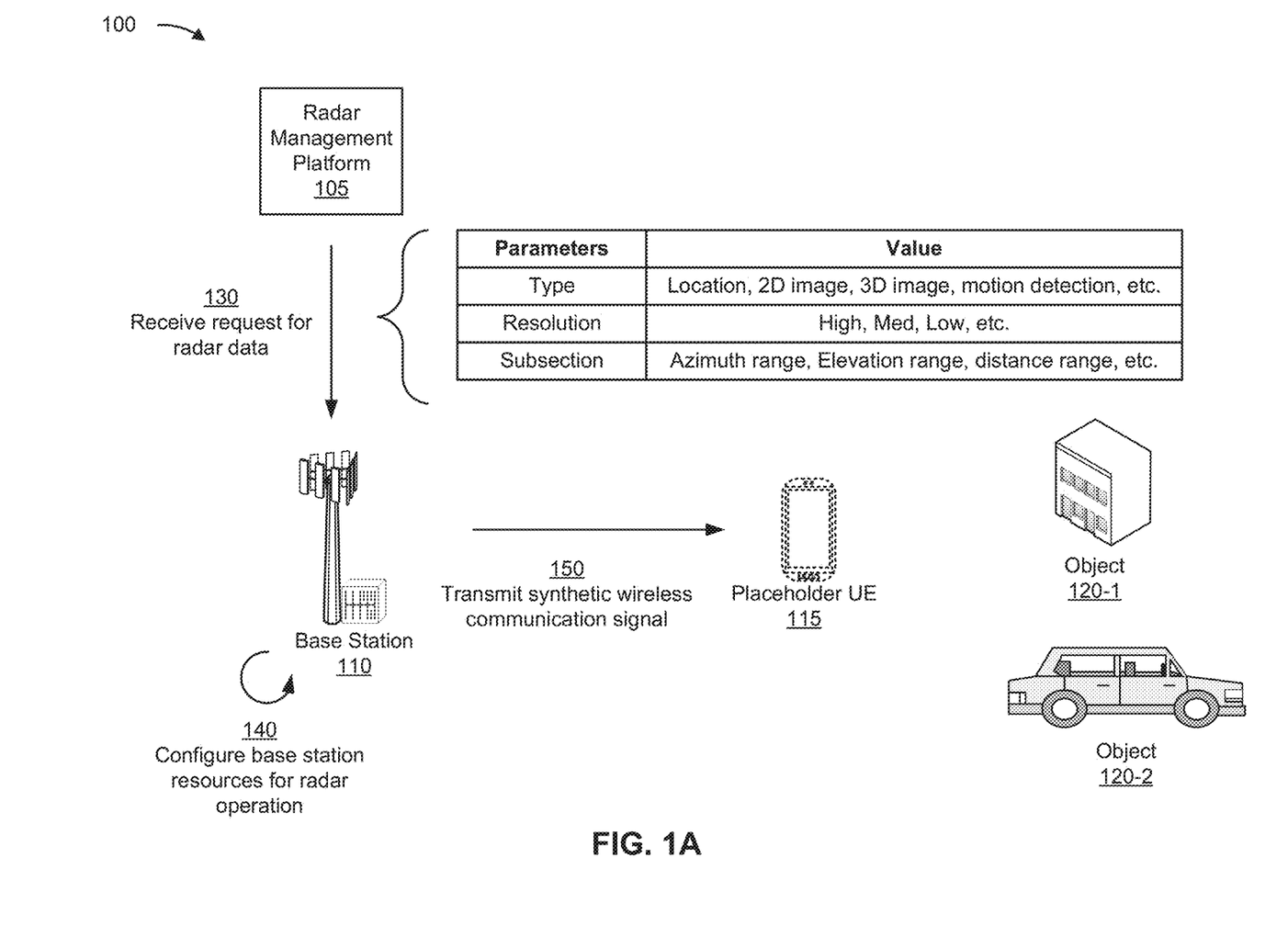
FIGS. 1A-1B are diagrams of one or more example implementations described herein.
Figure 1B:
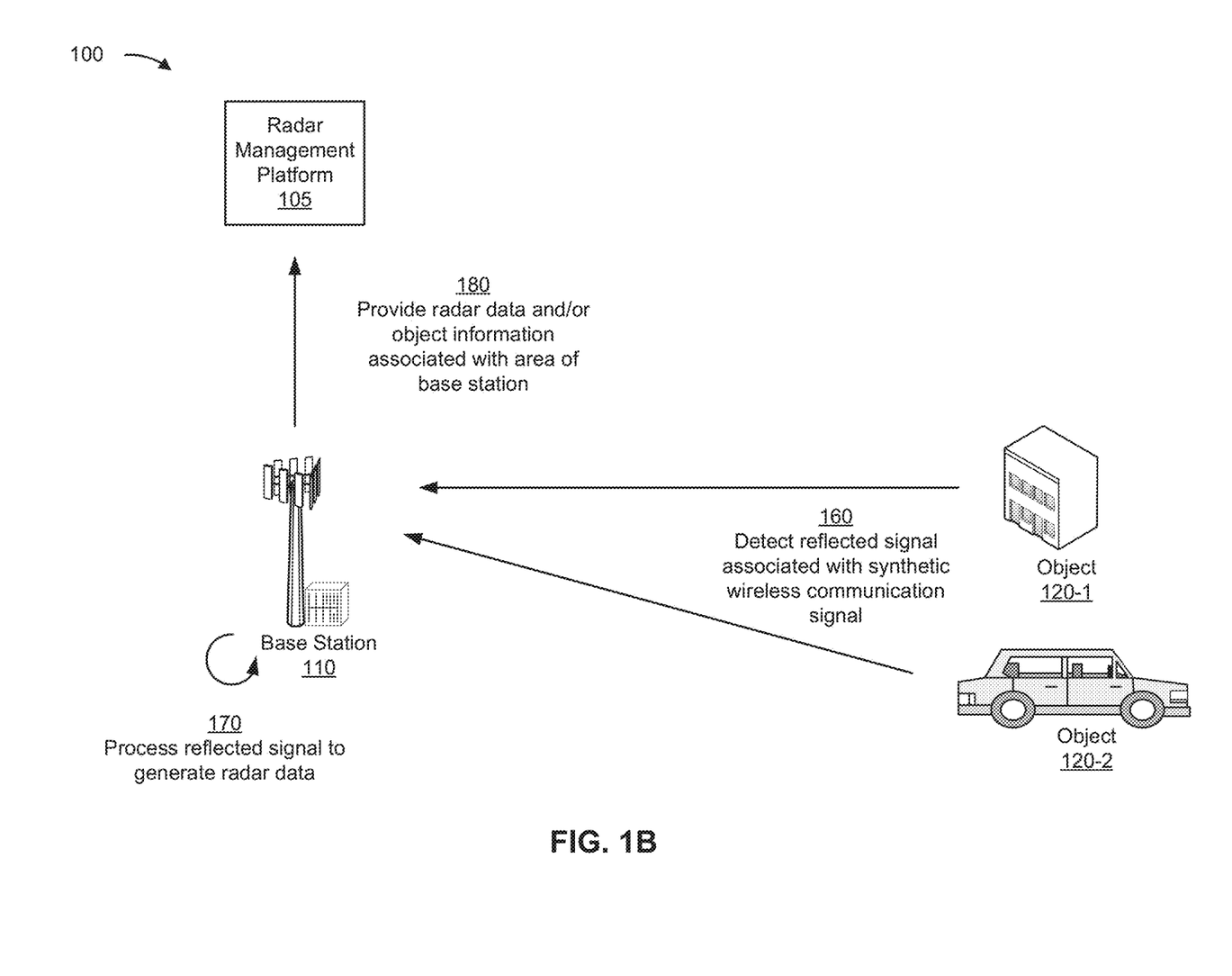

FIGS. 1A-1B are diagrams of one or more example implementations 100 described herein. As shown in FIG. 1A, radar management platform 105 may be associated with base station 110. Radar management platform 105 may include a system or platform that transmits requests, to one or more base stations, for radar data. The radar data may be used to detect objects in one or more areas associated with the one or more base stations.

Base station 110 may include a base station that is associated with a wireless communication network. For example, base station 110 may be a next generation node B (gNB) and the wireless communication network may comprises a fifth generation New Radio (5G/NR) wireless network. Base station 110 may transmit wireless communication signals (e.g., toward one or more user equipment (UE) including placeholder UE 115). Base station 110 may receive reflected signals associated with the wireless communication signals (e.g., reflected from an object 120-1 and an object 120-2) and process the reflected signals to generate radar data.

As shown in FIG. 1A, and by reference number 130, base station 110 may receive a request for radar data. For example, base station 110 may receive the request from radar management platform 105. For instance, radar management platform 105 may transmit the request to obtain the radar data and to determine (e.g., based on the radar data) one or more objects within an area associated with base station 110 (e.g., an area surrounding base station 110). In some examples, information regarding the one or more objects may be used to determine a topography of the area, to improve wireless communication network coverage associated with the area, to improve location and navigation services associated with the area, and/or the like (as explained in more detail below). The area of base station 110 may include a cell of a cellular network associated with base station 110, a section of the cell, and/or the like. In some instances, the section of the cell may corresponding to a beam (e.g., a beam width, a beam angle, and/or the like) of an antenna associated with base station 110.

In some implementations, radar management platform 105 may be used by an operator of base station 110 to transmit the request. For example, the operator may use radar management platform 105 to transmit the request to obtain the radar data. For example, he radar data may enable the operator to perform network planning and optimization. Alternatively, radar management platform 105 may be used by a user to transmit the request. The user may use radar management platform 105 to transmit the request to obtain the radar data. For example, the radar data may enable the user to determine a topology of the area associated with base station 110.

In some examples, the request may include information identifying one or more parameters for the radar data. As shown, in FIG. 1A, for example, the one or more parameters may include information identifying a radar data type associated with identifying an object (or characteristics of the object) to be detected in the area based on the radar data, an image resolution that is associated with an image that is to be generated based on the radar data, and/or a size parameter associated with a subsection of the area.

In some implementations, the information identifying the radar type may identify a type of data requested for the object such as, for example, location data (e.g., to determine a location of the object), two-dimensional (2D) data (e.g., to generate a 2D depiction of the object), three dimensional (3D) data (e.g., to generate a 3D depiction of the object), motion detection data (e.g., to determine a motion of the object), and/or the like. The information identifying the image resolution may identify an image resolution for a depiction of the image such as, for example, high resolution, medium resolution, low resolution, and/or the like.

The information identifying the size parameter may include information that may be used to identify the subsection of the area (e.g., boundaries of the subsection) such as, for example, information identifying an azimuth range directed from base station 110, an elevation range directed from base station 110, a distance range from base station 110, a set of geographical coordinates of a perimeter of the subsection, and/or the like. Based on the information identifying the size parameter, base station 110 may be able to identify a size, a location, and/or boundaries of the subsection.

As shown in FIG. 1A, and by reference number 140, base station 110 may configure base station resources for radar operation. For example, based on receiving the request for the radar data, base station 110 may configure the base station resources for the radar operation. As part of the radar operation, base station 110 may be configured to generate and transmit one or more wireless communication signals within the subsection of the area associated with base station 110, detect one or more reflected signals (e.g., the one or more wireless communication signals reflected from one or more objects), and process the one or more reflected signals to generate the radar data.

In some implementations, base station 110 may include a radar capability software that enables base station 110 to be configured for radar capability (e.g., the radar operation). For example, the radar capability software may determine that the request includes information indicating the radar data is requested and may enable base station 110 to configure the base station resources for the radar operation and to perform the radar operation based on the information indicating that the radar data is requested. The information indicating that the radar data is requested may be included in the information identifying the one or more parameters for the radar data.

For instance, base station 110 (e.g., using the radar capability software) may identify the information identifying the one or more parameters for the radar data from the request. Based on base station 110 identifying the information identifying the one or more parameters, the radar capability software may determine that the radar data is requested and may cause base station 110 to configure the base station resources for the radar operation. The base station resources may include wireless communication resources that include downlink resources (e.g., one or more downlink beams) and uplink resources (e.g., one or more uplink beams).

Based on determining that the radar data is requested, the radar capability software may cause base station 110 to allocate the wireless communication resources for generating and transmitting a wireless communication signal for use a radar signal. The radar capability software may identify, from the size parameter included in the request, that the radar data is associated with the subsection of the area (e.g., based on the size parameter identifying the subsection of the area associated with base station 110). The wireless communication signal may be generated for the purpose of being transmitted in the subsection to cause the wireless communication signal to be reflected (e.g., from one or more objects in the subsection) back to base station 110 as a radar signal. In other words, the radar capability software may cause base station 110 to generate the wireless communication signal to emulate a radar signal.

The wireless communication signal may be a synthetic wireless communication signal directed toward placeholder UE 115 as if placeholder UE 115 were located in the subsection of the area associated with base station 110. In other words, the synthetic wireless communication signal may be a signal that is not intended for communicating with a UE. As an example, the synthetic wireless communication signal may include ones and zeros (e.g., alternating ones and zeros). The above data included in the synthetic wireless communication signal is merely provided as an example. Other examples may differ from the above data included in the synthetic wireless communication signal. Placeholder UE 115 may correspond to a fictitious UE.

The radar capability software may cause base station 110 to generate the synthetic wireless communication signal (e.g., which is to be directed toward the subsection) based on a fictitious identifier for placeholder UE 115 (provided by the radar capability software). The radar capability software may cause base station 110 to direct the synthetic wireless communication signal toward the subsection of the area based on the information identifying the size parameter (e.g., which identifies the subsection of the area), when the synthetic wireless communication signal is transmitted.

In some implementations, the synthetic wireless communication signal may be configured according to a wireless communication protocol of the wireless communication network associated with base station 110. For example, the synthetic wireless communication signal may be configured according to 5G/NR. For instance, the synthetic wireless communication signal may comprise a millimeter wave signal.

The radar capability software may cause base station 110 to allocate the wireless communication resources for generating and transmitting the synthetic wireless signal and for receiving a reflected signal associated with the synthetic wireless signal (e.g., a signal that is a reflection of the synthetic wireless communication signal). In some examples, the radar capability software may cause base station 110 to determine, based on the one or more parameters, a configuration of the wireless communication resources. The configuration of the wireless communication resources may include an allocation of downlink resources (of the wireless communication resources), a schedule of the downlink resources (e.g., transmission time for transmitting the synthetic wireless communication signal), an allocation of uplink resources (of the wireless communication resources), and a schedule of the uplink resources (e.g., receipt time for receiving the reflected signal).

In some implementations, base station 110 (e.g., using the radar capability software) may identify the information identifying the image resolution included in the request for the radar data and may determine an amount of the wireless communication resources to be allocated based on the information identifying the image resolution. For example, the amount of the wireless communication resources to be allocated may increase as the image resolution increases. For instance, the amount of the wireless communication resources to be allocated for a medium image resolution may exceed the amount of the wireless communication resources to be allocated for a low image resolution. Similarly, the amount of the wireless communication resources to be allocated for a high image resolution may exceed the amount of the wireless communication resources to be allocated for a medium image resolution.

In some examples, the image resolution may be based on a size of an object to be detected. For example, a low image resolution may be used to detect a large object (e.g., a building), a medium image resolution may be used to detect a medium size object (e.g., a vehicle), and a high image resolution may be used to detect a small object (e.g., an object that can be carried by an individual).

Additionally, or alternatively, base station 110 (e.g., using the radar capability software) may identify the information identifying the size parameter (e.g., identifying the size of the subsection of the area) included in the request and may determine the amount of the wireless communication resources to be allocated based on the information identifying the size parameter. For example, the amount of the wireless communication resources to be allocated may increase as the size of the subsection increases. For instance, assume a first size of the subsection exceeds a second size of the subsection. In this regard, the amount of the wireless communication resources to be allocated for the first size may exceed the amount of the wireless communication resources to be allocated for the second size.

Base station 110 (e.g., using the radar capability software) may determine the schedule of the downlink resources and the schedule of the uplink resources based on a scheduling protocol of the wireless communication protocol. For example, the scheduling protocol may correspond to a scheduling protocol of 5G. In some implementations, base station 110 may be preprogrammed with information identifying the schedule of the downlink resources, the schedule of the uplink resources, and the scheduling protocol (collectively referred to as "scheduling information"). Alternatively, base station 110 may transmit a request for the scheduling information to a device associated with the operator and may receive the scheduling information from the device.

The scheduling information may indicate periods of time (e.g., time slots) when the wireless communication resources are used to communicate with UEs in the area and, for example, in the subsection of the area. In some implementations, base station 110 (e.g., using the radar capability software) may use the scheduling information to determine when base station 110 is to transmit the synthetic wireless communication signal and receive the reflected signal. In other words, base station 110 (e.g., using the radar capability software) may generate a schedule of transmission of the synthetic wireless communication signal and/or a schedule of reception of the reflected signal.

For example, base station 110 (e.g., using the radar capability software) may use the scheduling information to determine an availability of the wireless communication resources. In some examples, based on the scheduling information, base station 110 (e.g., using the radar capability software) may determine the periods of time during which the wireless communication resources are not used to communicate with the UEs. The radar capability software may cause base station 110 to allocate the wireless communication resources for transmitting the synthetic wireless signal and receiving a reflected signal associated with the synthetic wireless communication signal during such periods of time.

In some implementations, based on the scheduling information, base station 110 may identify wireless communication resources that are not used (or not frequently used) to communicate with UEs. In this regard, the radar capability software may cause base station 110 to dedicate such wireless communication resources for transmitting the synthetic wireless communication signal and for receiving the reflected signal. For example, the radar capability software may cause base station 110 to dedicate one or more beams, of base station 110, for transmitting the synthetic wireless communication signal and for receiving the reflected signal.

In some implementations, based on the availability of particular wireless communication sources, the radar capability software may cause base station 110 to allocate the particular wireless communication sources for periodic transmission of the synthetic wireless communication signal and reception of the reflected signal. For example, base station 110 may allocate the particular wireless communication sources for one or more periods of time. During a period of time, base station 110 may generate the synthetic wireless communication signal, transmit the synthetic wireless communication signal using the particular wireless communication resources, and receive the reflected signal using the particular wireless communication resources. In this regard, base station 110 may emulate the functionality of a chirp radar.

In some examples, the radar capability software may cause base station 110 to dedicate one or more additional beams, of base station 110, for a subsequent request for radar data (e.g., because the subsequent request may include information identifying an image resolution that exceeds the image resolution identified in the request received from radar management platform 105). For example, the image resolution (identified in the request) may be for the purpose of detecting medium sized objects (e.g., vehicles) whereas the image resolution (identified in the subsequent request) may be for the purpose of detecting objects smaller than vehicles (e.g., objects that may be carried by an individual).

In some implementations, base station 110 (e.g., using the radar capability software) may identify a wireless communication resource (for transmitting the synthetic wireless communication signal and/or for receiving the reflected signal) based on the image resolution identified in the request and based on characteristics of the wireless communication resource (e.g., beam width, beam gain, beam accuracy, and/or the like). For example, for an image resolution associated with large objects, base station 110 may identify and allocate a wireless communication resource associated with a wide beam. Alternatively, for an image resolution associated with small objects, base station 110 may identify and allocate a wireless communication resource associated with a beam accuracy that satisfies a threshold accuracy.

As shown in FIG. 1A, and by reference number 150, base station 110 may transmit synthetic wireless communication signal. For example, after configuring the base station resources for the radar operation, base station 110 may transmit the synthetic wireless communication signal (e.g., using the allocated downlink resources). In some implementations, after configuring the base station resources for the radar operation, base station 110 may generate and transmit the synthetic wireless communication signal in accordance the schedule of transmission (of the synthetic wireless communication signal) discussed above. In some implementations, when generating and transmitting the synthetic wireless communication signal, base station 110 may beamform the synthetic wireless communication signal toward the subsection of the area associated with base station 110.

When transmitting the synthetic wireless communication signal, base station 110 may transmit the synthetic wireless communication signal between downlink communication signals toward one or more UEs in the area, based on the schedule of transmission. In other words, base station 110 may transmit the synthetic wireless communication signal between periods of time during which downlink communication signals are transmitted toward the one or more UEs in the area. Additionally, base station 110 may transmit the synthetic wireless communication signal in a direction of the subsection. For example, the radar capability software may identify, in the request, the information identifying the size parameter (e.g., identifying the subsection of the area associated with base station 110) and may cause base station 110 to transmit the synthetic wireless communication signal in a direction of the subsection based on the information identifying the size parameter.

In some implementations, when transmitting the synthetic wireless communication signal, base station 110 may transmit a plurality of synthetic wireless communication signals within the boundaries of the subsection to emulate a radar scan of the subsection (e.g. a radar scan of an entirety of the subsection). For example, base station 110 may use the information identifying the azimuth range directed from base station 110 (included in the information identifying the size parameter) to transmit the plurality of synthetic wireless communication signals. For instance, base station 110 may transmit the plurality of synthetic wireless communication signals between an angle at one end of the azimuth range and another angle at another end of the azimuth range (e.g., transmit a first synthetic wireless communication signal at a first angle, transmit a second synthetic wireless communication signal at a second angle, and so on).

Additionally, or alternatively, base station 110 may use the information identifying the elevation range directed from base station 110 (included in the information identifying the size parameter) to transmit the plurality of synthetic wireless communication signals. For instance, base station 110 may transmit the plurality of synthetic wireless communication signals between an elevation at one end of the elevation range and another elevation at another end of the elevation range (e.g., transmit a first synthetic wireless communication signal at a first elevation, transmit a second synthetic wireless communication signal at a second elevation, and so on).

Additionally, or alternatively, base station 110 may use the information identifying the distance range from base station 110 (included in the information identifying the size parameter) to transmit the plurality of synthetic wireless communication signals. For instance, base station 110 may transmit the plurality of synthetic wireless communication signals between a location corresponding to one end of the distance range and another location correspond to another end of the distance range (e.g., transmit a first synthetic wireless communication signal at a first location, transmit a second synthetic wireless communication signal at a second location, and so on).

Additionally, or alternatively, base station 110 may use the information identifying the set of geographical coordinates of the perimeter of the subsection (included in the information identifying the size parameter) to transmit the plurality of synthetic wireless communication signals. For instance, base station 110 may transmit the plurality of synthetic wireless communication signals along the perimeter of the subsection (e.g., transmit a first synthetic wireless communication signal at a first location of the perimeter of the subsection, transmit a second synthetic wireless communication signal at a second location the perimeter of the subsection, and so on).

In some implementations, the radar capability software may determine a priority associated with the request. For example, the request may include sender identification information that identifies a sender of the request (e.g., the operator or the user). The radar capability software may determine the priority associated with the request based on the sender identification information. For example, the radar capability software may determine that the request is a high priority request when the radar capability software determines that the sender identification information identifies the operator. Similarly, the radar capability software may determine that the request is a high priority request when the radar capability software determines that the sender identification information identifies the user as a law enforcement personnel, a first responder, and/or the like.

In some examples, the radar capability software may determine that the request is a high priority request when the radar capability software determines that the sender identification information identifies the user as a subscriber to services provided by the operator and indicates that a level of subscription of the subscriber satisfies a threshold level. In other words, the radar capability software may determine a priority of the request based on the level of subscription. The above criteria for determining the request is a high priority request are merely provided as examples. Other examples may differ from the above criteria.

If the radar capability software determines that the request is a high priority request, the radar capability software may cause base station 110 to interrupt current communications (with UEs in the area) associated with wireless communication resources of base station 110 (e.g., including the allocated wireless communication resources) and cause base station 110 to use such wireless communication resources to transmit the synthetic wireless communication signal and receive the reflected signal. In other words, the radar capability software may cause base station 110 to be disconnected from the UEs in order to service the request when the request is a high priority request.

If the request is not a high priority request, the radar capability software may cause base station 110 to transmit the synthetic wireless communication signal in accordance with the schedule of transmission of the synthetic wireless communication signal (as described above) and/or receive the reflected signal in according with the schedule of reception of the reflected signal (as described above).

In some implementations, as an alternative to scheduling transmissions to placeholder UE 115 as discussed above, the radar capability software may cause base station 110 to use a broadcast channel (associated with base station 110) to transmit the synthetic wireless communication signal. The radar capability software may cause base station 110 to configure the broadcast channel based on the information identifying one or more parameters included in the request. For example, the radar capability software may base station 110 to configure the broadcast channel based on the size parameter, the image resolution, and/or the radar data type.

As shown in FIG. 1B, and by reference number 160, base station 110 may detect the reflected signal associated with synthetic wireless communication signal. For example, after transmitting the synthetic wireless communication signal, the radar capability software may cause base station 110 to detect (or receive) the reflected signal. For instance, base station 110 may be configured by the radar capability software to detect reflected signals as opposed to discarding reflected signals (as base station 110 typically does). For example, base station 110 may use the allocated uplink resources to detect the reflected signal in accordance with the schedule of reception. For instance, base station 110 may use the allocated uplink resources to receive the reflected signal during the periods of time discussed above. In some implementations, base station 110 may receive the reflected signal between uplink communication signals from one or more UEs in the area.

In some implementations, the radar capability software may determine a priority associated with the request, in a manner similar to the manner described above. If the radar capability software determines that the request is associated with a high priority, the radar capability software may cause base station 110 to interrupt current communications (with UEs in the area) associated with wireless communication resources of base station 110 (e.g., including the allocated uplink resources) and cause base station 110 to use such wireless communication resources to detect the reflected signal.

In other words, the radar capability software may cause base station 110 to be disconnected from the UEs in order to service the request when the request is a high priority request. If the request is not a high priority request, the radar capability software may cause base station 110 to use the allocated uplink resources to detect the reflected signal in accordance with the schedule of reception of the reflected signal.

As explained above, the reflected signal may correspond to the synthetic wireless communication signal reflected from one or more objects such as, for example, vehicles, buildings, individuals, and/or the like. As show in FIG. 1B, for example, the synthetic wireless communication signal may be reflected from an object 120-1 (e.g., depicted as a building) and from an object 120-2 (e.g., depicted as a vehicle), after the synthetic wireless communication signal is transmitted toward placeholder 115. In some examples, after the plurality of synthetic wireless communication signals are transmitted (as discussed in connection with reference 150 of FIG. 1), a first portion of the plurality of synthetic wireless communication signals may be reflected from object 120-1 and a second portion of the plurality of synthetic wireless communication signals may be reflected from object 120-2.

In some implementations, the reflected signal may be detected by a dedicated radar receiver (e.g., a dedicated radar reception antenna) that is configured to receive reflected signals. The dedicated radar receiver may be separate from base station 110. Alternatively, the dedicated radar receive may be integrated with base station 110. The dedicated radar receiver may provide the reflected signal to one or more processors associated with base station 110 to permit the one or more processors to detect and process the reflected signal to generate the radar data.

As shown in FIG. 1B, and by reference number 170, base station 110 may process the reflected signal to generate the radar data. For example, the radar capability software may configure base station 110 to generate the radar data based on the reflected signal. The radar capability software may process the reflected signal using one or more signal processing techniques for generating radar data.

In some implementations, the radar capability software may identify the information identifying the radar type (included in the request); analyze, based on the radar data type, a characteristic of the reflected signal; and generate, based on an analysis of the characteristic, the radar data according to the radar data type. The radar data may corresponding to a rendering of the subsection of the area according to the radar data type. The rendering may include information identifying objects included in the subsection (including the object to be detected in the area).

For example, assume that the radar capability software identifies the information identifying the radar type (included in the request) and determines that the type of data requested is 2D data. Based on determining that the type of data requested is 2D data, the radar capability software may analyze a characteristic of the reflected signal associated with 2D data. For example, the radar capability software may analyze a signal strength of the reflected signal (e.g., using one or more signal strength measurement techniques). Based on analyzing the signal strength, the radar capability software may generate the radar data.

In other words, information regarding the signal strength may be used to generate the radar data (e.g., using the one or more signal processing techniques for generating radar data). The radar data may be used to generate 2D data. For example, the radar capability software may generate a 2D rendering of the subsection of the area associated with base station 110 based on signal strength of the reflected signal. For example, the 2D rendering may include the information identifying the objects included in the subsection.

Alternatively, assume that the radar capability software identifies the information identifying the radar type (included in the request) and determines that the type of data requested is 3D data. Based on determining that the type of data requested is 3D data, the radar capability software may analyze a characteristic of the reflected signal associated with 3D data. For example, the radar capability software may analyze the signal strength of the reflected signal (e.g., using the one or more signal strength measurement techniques) and a time of flight associated with the reflected signal (e.g., using one or time of flight measurement techniques). Based on analyzing the signal strength and the time of flight, the radar capability software may generate the radar data.

In other words, information regarding the signal strength and the time of flight may be used to generate the radar data (e.g., using the one or more signal processing techniques for generating radar data). The radar data may be used to generate 3D data. For example, the radar capability software may generate a 3D rendering of the subsection of the area associated with base station 110 based on the signal strength and the time of flight of the reflected signal. For example, the 3D rendering may include the information identifying the objects included in the subsection.

Alternatively, assume that the radar capability software identifies the information identifying the radar type (included in the request) and determines that the type of data requested is motion detection data. Based on determining that the type of data requested is motion data, the radar capability software may analyze a characteristic of the reflected signal associated with motion detection data. For example, the radar capability software may analyze the signal strength of the reflected signal (e.g., using the one or more signal strength measurement techniques) and the time of flight associated with the reflected signal (e.g., using the one or time of flight measurement techniques).

Additionally, the radar capability software may perform doppler compensation (e.g., using one or more doppler compensation techniques) with respect to the reflected signal to compensate for a shift of frequency associated with the reflected signal. Based on analyzing the signal strength and the time of flight and based on performing the doppler compensation, the radar capability software may generate the radar data. In other words, information regarding the signal strength, the time of flight, and the doppler compensation may be used to generate the radar data (e.g., using the one or more signal processing techniques for generating radar data). The radar data may be used to generate motion detection data. For example, the radar capability software may generate a motion detection rendering of the subsection of the area associated with base station 110 based on the signal strength, the time of flight, and the doppler compensation. For example, the motion detection rendering may include information identifying a motion of the objects included in the subsection.

Alternatively, assume that the radar capability software identifies the information identifying the radar type (included in the request) and determines that the type of data requested is location data. The radar capability software may analyze the signal strength of the reflected signal (e.g., using the one or more signal strength measurement techniques), analyze the time of flight associated with the reflected signal (e.g., using the one or time of flight measurement techniques), and/or perform the doppler compensation (e.g., using the one or more doppler compensation techniques). Based on analyzing the signal strength, analyzing the time of flight, and/or performing the doppler compensation, the radar capability software may generate the radar data. The radar data may be used to generate location data of an object in the subsection. The location data may be selectively rendered as 2D data, 3D data, and/or motion detection data.

Base station 110 may perform an action associated with the radar data, as explained in more detail below.

As shown in FIG. 1B, and by reference number 180, base station 110 may provide radar data and/or object information associated with area of base station. For example, the radar capability software may configure base station 110 to provide, to radar management platform 105, the radar data and object information identifying the objects included in the subsection.

In some implementations, the radar capability software may cause base station 110 to generate, based on the radar data, an image that depicts a subsection of the area and provide the image for display (e.g., via a user interface associated with the operator and/or the user). The image may include a 2D image, a 3D image, and/or the like.

In some implementations, the radar capability software may identify, based on the radar data, a location of an object within the area or the subsection of the area and provide, to a device (e.g., associated with the operator and/or the user), location information that identifies the location to permit the location of the object to be displayed or processed. Additionally, or alternatively, the radar capability software may analyze the radar data in association with time-of-flight information associated with the synthetic wireless communication signal to generate object data associated with the object and process, using an object recognition model, the object data to identify a type of the object. The radar capability software may indicate, to the device (e.g., associated with the operator and/or the user), the type of the object.

Additionally, or alternatively, the radar capability software may analyze the radar data in association with doppler information associated with the synthetic wireless communication signal to generate movement data associated with the object. The radar capability software may provide, to the device (e.g., associated with the operator and/or the user), movement information that identifies movement of the object within the area during a time period.

In some implementations, the radar capability software may utilize a dual polarization capability of base station 110 to detect weather conditions. For example, the radar capability software may cause base station 110 to transmit a synthetic wireless communication signal over a first polarization and over a second polarization associated with base station 110. The radar capability software may detect a first reflected signal (e.g., associated with the synthetic wireless communication signal transmitted over the first polarization) and detect a second reflected signal (e.g., associated with the synthetic wireless communication signal transmitted over the second polarization).

The radar capability software may determine a difference between the first reflected signal and the second reflected signal. Based on a value of the difference, the radar capability software may determine a weather condition (e.g., rainy condition, hail condition, snowy condition, and/or the like). For example, a first value of the difference may indicate a rainy condition, a second value of the difference may indicate a hail condition, and a third value of the difference may indicate a snowy condition.

The radar data may enable radar management platform 105 to detect objects (e.g., static objects and dynamic objects) in the subsection. In some instances, information regarding the objects (e.g., static objects) may be used by the operator for network (e.g., wireless communication network) planning and optimization purposes. The network planning and optimization may include adjusting one or more antennas of base station 110 (e.g., a directions, a tilt, and/or the like) to improve network coverage, reliability, and capacity (e.g., by identifying and reducing loss of signal). Additionally, or alternatively, the information regarding the objects (e.g., dynamic objects) may be used by the operator to dynamically adjust one or more beams of base station 110 (e.g., based on movement and location of the objects).

Additionally, or alternatively, the information regarding the objects (e.g., dynamic objects) may be used by the operator to improve location services and/or navigation services for the user (e.g., subscriber). For example, the information regarding the objects may be used to detect a location of an object and/or to improve an accuracy of the location of the object. Additionally, or alternatively, the radar data may be used by the user (e.g., law enforcement personnel, first responder, and/or the like) to detect and/or prevent a security event (e.g., detect an individual with a weapon).

As indicated above, FIGS. 1A-1B are provided merely as examples. Other examples may differ from what is described with regard to FIGS. 1A-1B.

Figure 2:
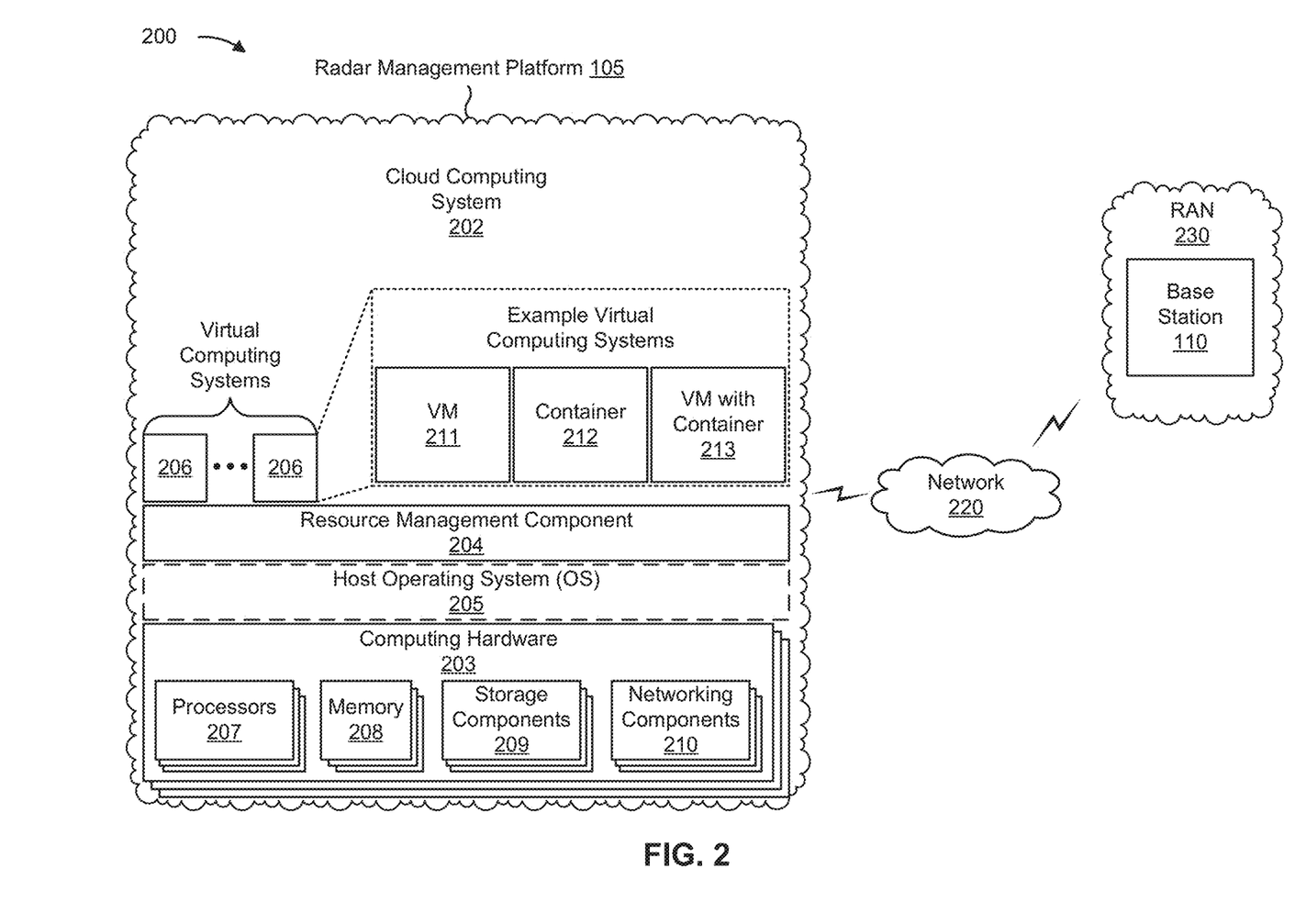
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a radar management platform 105, which may include one or more elements of and/or may execute within a cloud computing system 202. The cloud computing system 202 may include one or more elements 203-213, as described in more detail below. As further shown in FIG. 2, environment 200 may include a base station 110, a network 220, and/or radio access network (RAN) 230. Devices and/or elements of environment 200 may interconnect via wired connections and/or wireless connections.

Base station 110 may include one or more devices capable of communicating with one or more UEs using a cellular Radio Access Technology (RAT). For example, base station 110 may include a base transceiver station, a radio base station, a node B, an evolved node B (eNB), a gNB, a base station subase station 110 ystem, a cellular site, a cellular tower (e. g., a cell phone tower, a mobile phone tower, etc.), an access point, a transmit receive point (TRP), a radio access node, a macrocell base station, a microcell base station, a picocell base station, a femtocell base station, or a similar type of device. Base station 110 may transfer traffic between a UE (e. g., using a cellular RAT), and/or a network. Base station 110 may provide one or more cells that cover geographic areas. Base station 110 may be a mobile base station. Base station 110 may be capable of communicating using multiple RATs. Base 110 may be included in radio access network (RAN) 230.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the radar management platform 201 may include one or more elements 203-213 of the cloud computing system 202, may execute within the cloud computing system 202, and/or may be hosted within the cloud computing system 202, in some implementations, the radar management platform 201 may not be cloud-based (e.g., may be implemented outside of a cloud computing system) or may be partially cloud-based. For example, the radar management platform 201 may include one or more devices that are not part of the cloud computing system 202, such as device 300 of FIG. 3, which may include a standalone server or another type of computing device. The radar management platform 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

RAN 230 may include a plurality of base stations (e.g., base stations similar to base station 110).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
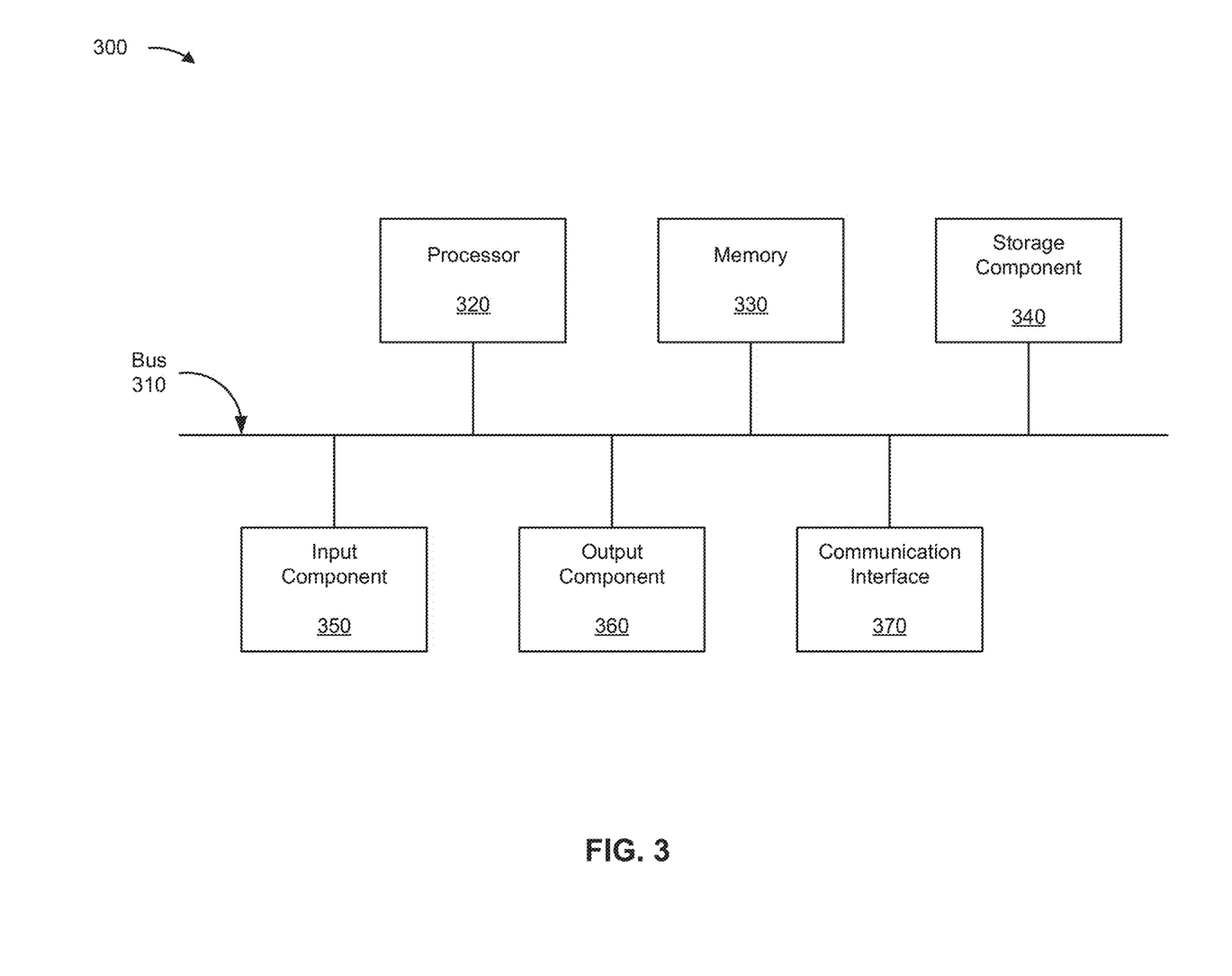
FIG. 3 is a diagram of example components of one or more devices of FIG. 2.

FIG. 3 is a diagram of example components of a device 300, which may correspond to radar management platform 105 and base station 110. In some implementations, radar management platform 105 and base station 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
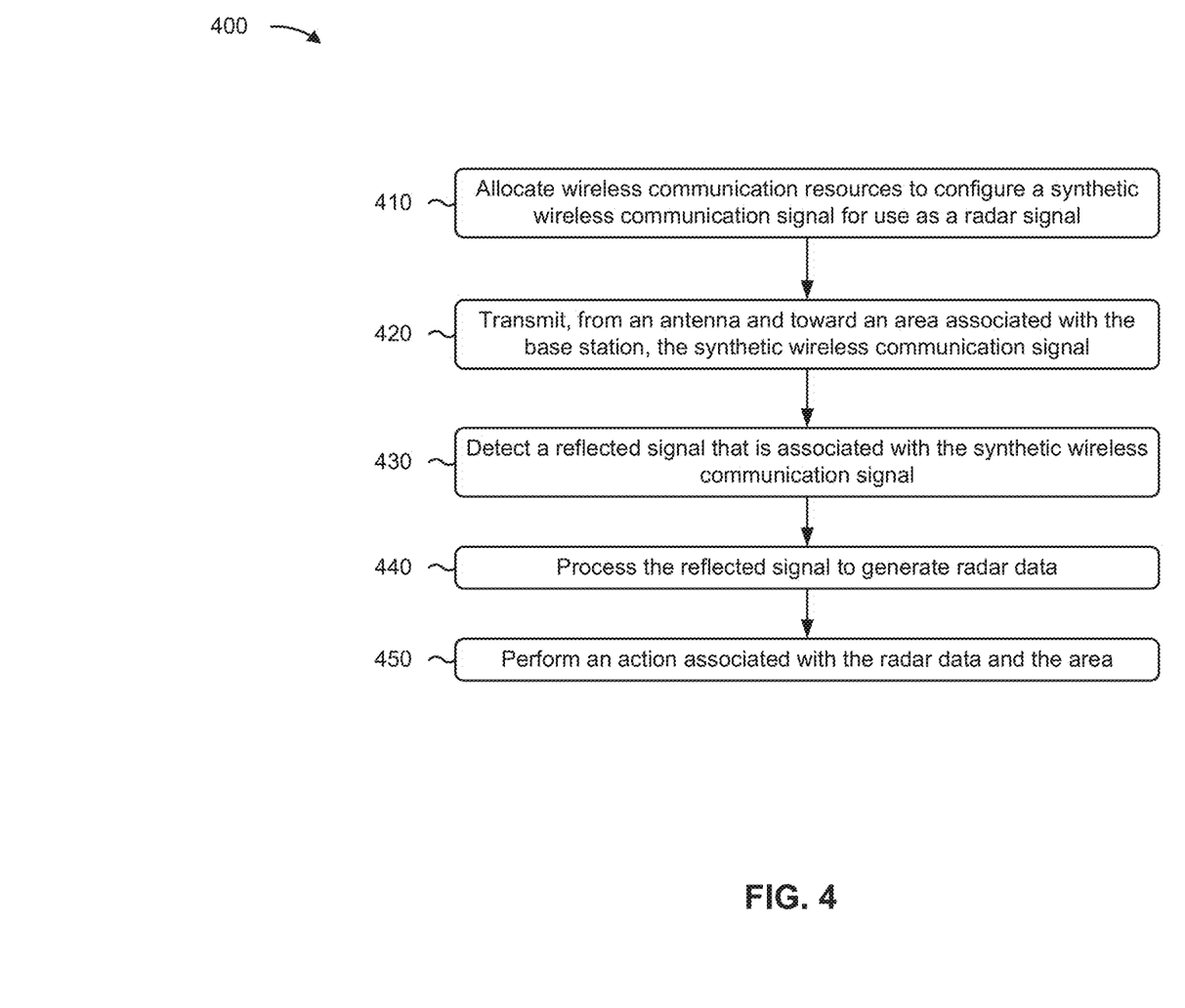
FIG. 4 is a flow chart of an example process associated with enabling and utilizing radar capability on a wireless communication.

FIG. 4 is a flowchart of an example process 400 associated with enabling and utilizing radar capability on a wireless communication. In some implementations, one or more process blocks of FIG. 4 may be performed by a base station (e.g., base station 110). In some implementations, one or more process blocks of FIG. 4 may be performed by another device or a group of devices separate from or including the radar management platform, such as a radar management platform (e.g., radar management platform 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include allocating wireless communication resources to configure a synthetic wireless communication signal for use as a radar signal (block 410). For example, the base station may allocate wireless communication resources to configure a synthetic wireless communication signal for use as a radar signal, as described above. In some implementations, the synthetic wireless communication signal is configured according to a wireless communication protocol of a wireless communication network that is associated with the base station. In some implementations, the wireless communication resources are allocated according to a scheduling protocol of the wireless communication protocol.

In some implementations, the synthetic wireless communication signal comprises a millimeter wave signal and the wireless communication network comprises a $5^{th}$ generation New Radio (5G/NR) wireless network.

In some implementations, a configuration of the wireless communication resources includes: an allocation of downlink resources of the wireless communication resources; a schedule of the downlink resources; an allocation of uplink resources of the wireless communication resources; and schedule of the uplink resources.

In some implementations, process 400 may include determining, based on the size parameter, a configuration of the wireless communication resources for obtaining the radar data associated with the subsection of the area; and generating a schedule of transmissions of the synthetic wireless communication signal using the configuration of the wireless communication resources. The synthetic wireless communication signal may be transmitted according to the schedule of transmissions and using downlink resources of the configuration of the wireless communication resources.

As further shown in FIG. 4, process 400 may include transmitting, from an antenna and toward an area associated with the base station, the synthetic wireless communication signal (block 420). For example, the base station may transmit, from an antenna and toward an area associated with the base station, the synthetic wireless communication signal, as described above. In some implementations, transmitting the synthetic wireless communication signal comprises transmitting the synthetic wireless communication signal between downlink communication signals toward one or more user equipment in the area.

In some implementations, transmitting the synthetic wireless communication signal includes beamforming the synthetic wireless communication signal toward a subsection of the area that is identified in the request. In some implementations, the radar data may be associated with the subsection of the area.

As further shown in FIG. 4, process 400 may include detecting a reflected signal that is associated with the synthetic wireless communication signal (block 430). For example, the base station may detect a reflected signal that is associated with the synthetic wireless communication signal, as described above. In some implementations, the reflected signal may be detected using an uplink resource of the configuration of the wireless communication resources.

As further shown in FIG. 4, process 400 may include process the reflected signal to generate radar data (block 440). For example, the base station may process the reflected signal to generate radar data, as described above. In some implementations, processing the reflected signal comprises: identifying a radar data type; analyzing, based on the radar data type, a characteristic of the reflected signal; and generating, based on an analysis of the characteristic, the radar data according to the radar data type.

As further shown in FIG. 4, process 400 may include performing an action associated with the radar data and the area (block 450). For example, the base station may perform an action associated with the radar data and the area, as described above.

In some implementations, process 400 includes generating, based on the radar data, an image that depicts a subsection of the area, and providing the image for display via a user interface. In some implementation the subsection is identified in the request based on at least one of: an azimuth range directed from the base station, an elevation range directed from the base station, a distance range from the base station, or a set of geographical coordinates of a perimeter of the subsection.

In some implementations, process 400 includes identifying, based on the radar data, a location of an object within the area, wherein the radar data indicates that the reflected signal is a reflection of the transmitted synthetic wireless communication signal from the object, and providing, to a device, location information that identifies the location to permit the location of the object to be displayed or processed.

In some implementations, process 400 includes analyzing the radar data in association with time-of-flight information associated with the synthetic wireless communication signal to generate object data associated with the object, process, using an object recognition model, the object data to identify a type of the object, and indicating, to the device, the radar data type of the object.

In some implementations, process 400 includes analyzing the radar data in association with doppler information associated with the synthetic wireless communication signal to generate movement data associated with the object, and providing, to the device, movement information that identifies movement of the object within the area during a time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different form of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the term "has," "have," "having," or the like are intended to be open-ended term. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a base station of a wireless communication network, a request for radar data associated with an area;
   transmitting, by the base station and based on a configuration of wireless communication resources for obtaining the radar data, a synthetic wireless communication signal that is configured for use as a radar signal;

processing, by the base station, a reflected signal, associated with the synthetic wireless communication signal, to generate the radar data; and performing, by the base station, an action that includes at least one of:
- indicating information regarding an object that is determined based on analysis of the radar data, wherein the information regarding the object includes information identifying at least one of an azimuth range directed from the base station, an elevation range directed from the base station, a distance range from the base station, or a set of geographical coordinates of a perimeter of a subsection of the area;
- providing an image, in at least two dimensions, of the object, wherein the image is generated based on analysis of the radar data; or
- providing movement information associated with the object, wherein the movement information is determined based on information associated with the synthetic wireless communication signal and the reflected signal.

2. The method of claim 1, further comprising:
providing location information that identifies a location of the object.

3. The method of claim 1, wherein performing the action includes providing the image of the object, and wherein the image is a three-dimensional image that is generated based on the radar data and based on time-of-flight information associated with the synthetic wireless communication signal and the reflected signal.

4. The method of claim 1, wherein the synthetic wireless communication signal is configured according to a protocol of the wireless communication network, and wherein the wireless communication network includes at least one of:
a cellular network,
a public land mobile network (PLMN),
a local area network (LAN), or
a wide area network (WAN).

5. The method of claim 1, further comprising:
identifying a type of the object using an object recognition model and based on the radar data and time-of-flight information associated with the synthetic wireless communication signal; and
indicating the type of the object.

6. The method of claim 1, wherein performing the action includes providing the movement information associated with the object, and wherein the movement information identifies movement of the object within the area during a time period.

7. The method of claim 1, wherein the synthetic wireless communication signal is based on a configuration of wireless communication resources for obtaining the radar data, and wherein the configuration of the wireless communication resources includes:
an allocation of downlink resources of the wireless communication resources;
a schedule of the downlink resources;
an allocation of uplink resources of the wireless communication resources; or
a schedule of the uplink resources.

8. A base station, comprising:
one or more processors configured to:
receive a request for radar data associated with an area;
transmit, based on allocated wireless communication resources of the base station, a synthetic wireless communication signal that is configured for use as a radar signal;
process a reflected signal, associated with the synthetic wireless communication signal, to generate the radar data; and
provide information associated with an object, in the area, that is identified based on the radar data, wherein providing the information associated with the object includes:
providing information identifying at least one of an azimuth range directed from the base station, an elevation range directed from the base station, a distance range from the base station, or a set of geographical coordinates of a perimeter of a subsection of the area;
providing an image, in at least two dimensions, of the object, wherein the image is generated based on analysis of the radar data; or
providing movement information associated with the object, wherein the movement information is determined based on information associated with the synthetic wireless communication signal.

9. The base station of claim 8, wherein the one or more processors are further configured to:
generate a three-dimensional rendering identifying the object in a subsection of the area.

10. The base station of claim 8, wherein the one or more processors are further configured to:
generate a three-dimensional depiction of the object.

11. The base station of claim 8, wherein:
the synthetic wireless communication signal is transmitted using a downlink resource of the wireless communication resources, and
the reflected signal is detected using an uplink resource of the wireless communication resources.

12. The base station of claim 8, wherein the synthetic wireless communication signal is configured according to a protocol of a wireless communication network that includes at least one of:
a cellular network,
a public land mobile network (PLMN),
a local area network (LAN), or
a wide area network (WAN).

13. The base station of claim 8, wherein the request identifies an image resolution associated with the radar data.

14. The base station of claim 8, wherein the synthetic wireless communication signal is a millimeter wave signal associated with a fifth generation New Radio (5G/NR) wireless network.

15. A non-transitory computer-readable medium storing a set of instructions, the set of instructions comprising:
one or more instructions that, when executed by one or more processors of a base station, cause the base station to:
transmit, from an antenna and toward an area, a synthetic wireless communication signal that is configured for use as a radar signal;
process a reflected signal, associated with the synthetic wireless communication signal, to generate radar data; and
perform an action that includes causing the base station to:
indicate information regarding an object that is determined based on analysis of the radar data, wherein the information regarding the object includes information identifying at least one of an azimuth range directed from the base station, an elevation range directed from the base station, a distance range from the base station, or a set of geographical coordinates of a perimeter of a subsection of the area;

provide an image, in at least two dimensions, of the object, wherein the image is generated based on analysis of the radar data; or provide movement information associated with the object, wherein the movement information is determined based on information associated with the synthetic wireless communication signal and the reflected signal.

16. The non-transitory computer-readable medium of claim 15, wherein the one or more instructions cause the base station to:

receive a request for radar data associated with the area, wherein the synthetic wireless communication signal is transmitted based on the request.

17. The non-transitory computer-readable medium of claim 16, wherein the request identifies a type of data requested for the object.

18. The non-transitory computer-readable medium of claim 15, wherein the one or more instructions, that cause the base station to provide the image, cause the base station to:

provide the image having an image resolution, wherein the image resolution is based on a size of the object.

19. The non-transitory computer-readable medium of claim 18, wherein the one or more instructions cause the base station to:

configure an amount of wireless communication resources allocated to the synthetic wireless communication signal based on the image resolution.

20. The non-transitory computer-readable medium of claim 18, wherein the one or more instructions cause the base station to:

configure a beam characteristic of the synthetic wireless communication signal based on the image resolution.

* * * * *